United States Patent
Freese et al.

(10) Patent No.: US 10,832,170 B2
(45) Date of Patent: Nov. 10, 2020

(54) DATA DRIVEN FEATURIZATION AND MODELING

(71) Applicant: Grand Rounds, Inc., San Francisco, CA (US)

(72) Inventors: Nathaniel Sayer Freese, San Francisco, CA (US); Ricardo Nuno Silva Moura Pinho, San Francisco, CA (US); Matthew Steven Pancia, San Francisco, CA (US); Seiji James Yamamoto, San Francisco, CA (US)

(73) Assignee: GRAND ROUNDS, INC., San Francisco, CA (US)

( * ) Notice: Subject to any disclaimer, the term of this patent is extended or adjusted under 35 U.S.C. 154(b) by 610 days.

(21) Appl. No.: 15/633,603

(22) Filed: Jun. 26, 2017

(65) Prior Publication Data

US 2017/0308814 A1    Oct. 26, 2017

Related U.S. Application Data

(63) Continuation of application No. 15/076,560, filed on Mar. 21, 2016, now Pat. No. 9,691,026.

(51) Int. Cl.
*G06N 20/00* (2019.01)
*G06N 5/02* (2006.01)
*G06F 16/951* (2019.01)

(52) U.S. Cl.
CPC ........... *G06N 20/00* (2019.01); *G06F 16/951* (2019.01); *G06N 5/022* (2013.01)

(58) Field of Classification Search
CPC ........................................................ G06N 3/00
USPC ........................................................ 706/15, 45
See application file for complete search history.

(56) References Cited

U.S. PATENT DOCUMENTS

| | | | |
|---|---|---|---|
| 2005/0234740 A1* | 10/2005 | Krishnan | G06Q 10/06398 705/2 |
| 2011/0022479 A1 | 1/2011 | Henley | |
| 2014/0244305 A1* | 8/2014 | Schoenberg | G06Q 10/10 705/3 |
| 2015/0073942 A1 | 3/2015 | Narasimhan et al. | |
| 2015/0134388 A1 | 5/2015 | Yoo et al. | |
| 2015/0248613 A1* | 9/2015 | Harris | G06F 19/3481 706/46 |

* cited by examiner

*Primary Examiner* — David R Vincent
(74) *Attorney, Agent, or Firm* — Finnegan, Henderson, Farabow, Garrett & Dunner LLP

(57) ABSTRACT

Computer-implemented systems and methods are disclosed for data driven expertise mapping. The systems and methods provide for obtaining data sets from data sources, wherein the data sets include services related data, analyzing the data sets, wherein the analysis generates information representative of the services related data, and generating training sets related to the data sets, wherein the training sets are based on known values. The systems and methods further provide for generating models, wherein the models are based on determining services provided by service providers using a combination of the services related data, the analysis of the data sets and the training sets, and provide a mapping of at least one service to service providers. The systems and methods additionally include evaluating the models based on known values and storing an indication for providing to a graphical user interface based on more models.

18 Claims, 6 Drawing Sheets

| Professional ID | Gender | Age | Location | Specialty | Affiliations |
|---|---|---|---|---|---|
| 1 | M | 54 | 94403 | Cardiology | PAMF |
| 2 | M | 60 | 92037 | Pediatrics | Scripps |
| 3 | F | 46 | 44195 | Orthopaedics | Cleveland Clinic |
| 4 | F | 70 | 85259 | Neurology | Mayo Clinic |
| 5 | M | 27 | 90048 | Internal Medicine | Cedar Sinai |
| . | . | . | . | . | . |
| . | . | . | . | . | . |
| . | . | . | . | . | . |
| N | M | 32 | 21287 | Ophthalmology | Johns Hopkins |

Fig. 3

| Event ID | Person ID | Cost | Code1 | Code2 | Code3 | Date | Professional ID |
|---|---|---|---|---|---|---|---|
| 1 | 1 | $8,000 | 409 | 10021 | R0076 | 1/1/2010 | 3 |
| 2 | 1 | $2,500 | 531 | 0001F | C9602 | 9/26/2012 | 3 |
| 3 | 1 | $100 | 461 | 47350 | A9152 | 7/27/2015 | 3 |
| 4 | 3 | $1,200 | 780.52 | 72345 | A9273 | 7/23/2005 | 3 |
| 5 | 5 | $180 | 787 | 99214 | G0009 | 3/17/2011 | 2 |
| 6 | 5 | $55 | 786.2 | 99213 | A4209 | 6/3/2013 | 5 |
| . | . | . | . | . | . | . | . |
| . | . | . | . | . | . | . | . |
| . | . | . | . | . | . | . | . |
| N | N | $150 | 523 | 97154 | G0205 | 2/5/2014 | 1 |

Fig. 4

| Event ID | Product ID | Person ID | Cost | Date | Professional ID |
|---|---|---|---|---|---|
| 1 | 0573-0133 | 1 | $4,500 | 1/1/2010 | 3 |
| 2 | 29485-1887 | 1 | $5,500 | 9/26/2012 | 3 |
| 3 | 30142-027 | 1 | $325 | 7/27/2015 | 3 |
| 4 | 30142-055 | 3 | $500 | 7/23/2005 | 3 |
| 5 | 64406-011 | 5 | $1,000 | 3/17/2011 | 2 |
| 6 | 66758-050 | 5 | $60 | 6/3/2013 | 7 |
| . | . | . | . | . | . |
| . | . | . | . | . | . |
| . | . | . | . | . | . |
| N | ZZ | N | $150 | 2/5/2014 | 18 |

Fig. 5

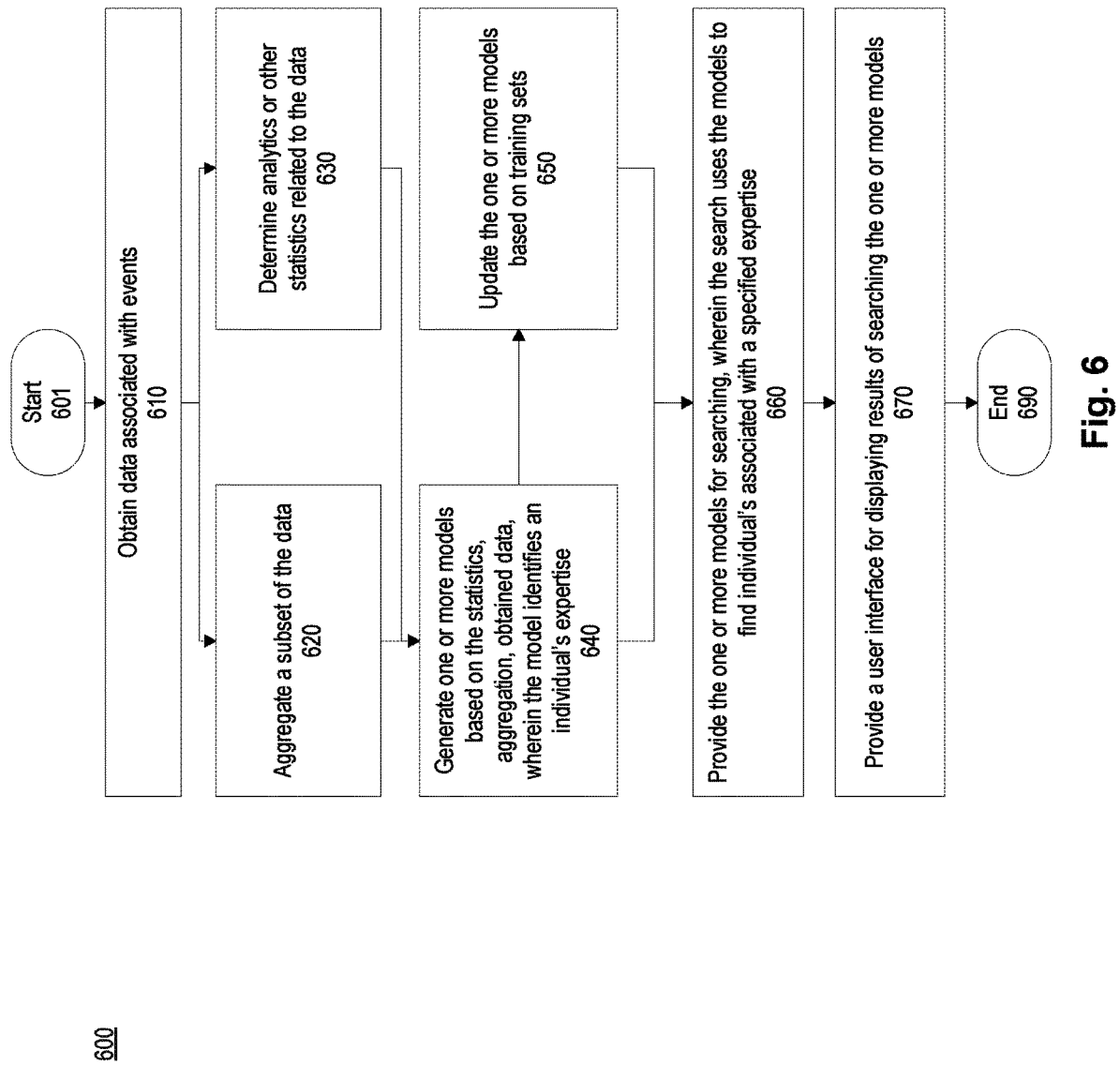

DATA DRIVEN FEATURIZATION AND MODELING

REFERENCE TO RELATED APPLICATIONS

This application is a continuation of U.S. Non-Provisional patent application Ser. No. 15/076,560, filed on Mar. 21, 2016, the disclosure of which is expressly incorporated herein by reference in its entirety.

BACKGROUND

Large datasets exist mapping associations between services and service providers across industries. Professionals in many different industries provide services to individuals. Details about these services are often stored in large data sets with loose associations. Moreover, as different industries become more and more complex, the professionals within those industries begin to focus their training and experience on specific aspects of their industry complicating existing classification techniques that are too broad to capture specialization. The professionals become skilled in specific, narrow topics at the expense of being less knowledgeable about other areas of the industry.

Determining which service providers offer a specific service or services can often be difficult and confusing. Traditional categorizations of professionals do not accurately indicate their specific expertise or the specific services provided. Most directories of professionals do not provide enough detail to describe the exact skill sets of various professionals in a broad industry.

Information related to provided services is often self-reported by the professional, and professionals will often exaggerate the breadth of their expertise. Some professionals can provide recommendations or referrals, but these can also be unreliable as the professional providing the recommendation or referral may not be knowledgeable about the best colleagues to perform the service. Moreover, it may not always be clear what exact services are required further complicating the ability to find an appropriate professional. There is an increasing need to provide meaningful insight into the services and expertise of specific professionals within an industry and an increasing need to provide data driven analytical techniques to associate services with service providers.

Over time, more and more data is becoming available describing characteristics of the actual services that have been provided by service providers. But there is a significant gap between the various types of data available and an ability to dynamically process that data in a meaningful way that provides a benefit to those in seeking a professional.

Some current systems relying on data uses simple counting of the number of times a professional has performed a particular service. But this approach fails if there is incomplete data for other professionals. This type of data may not indicate if the professional has performed the service more than those other professionals for which there is no data. Moreover, this type of analysis provides no indication of the quality of the service provided. Additional systems may rely on consumer provided reviews, but this type of data can often provide too little data to be significant and can often be skewed towards one or two individuals who had a particularly good or bad experience.

BRIEF DESCRIPTION OF THE DRAWINGS

Reference will now be made to the accompanying drawings showing example embodiments of this disclosure. In the drawings:

FIG. 3 is an exemplary data structure consistent with embodiments of the present disclosure.

FIG. 4 is an exemplary data structure consistent with embodiments of the present disclosure.

FIG. 5 is an exemplary data structure consistent with embodiments of the present disclosure.

FIG. 6 is a flowchart of an exemplary method for data driven expertise mapping, consistent with embodiments of the present disclosure.

DETAILED DESCRIPTION

Reference will now be made in detail to the exemplary embodiments implemented according to the present disclosure, the examples of which are illustrated in the accompanying drawings. Wherever possible, the same reference numbers will be used throughout the drawings to refer to the same or like parts.

Many industries are becoming more and more specialized but are failing to provide an accurate and effective mechanism for matching consumer needs with an appropriate professional. There is currently a need to develop methods for building models that can analyze the available industry specific data in a standard way to provide accurate information about the specific services offered by various professionals in order to allow consumers to easily and accurately find professionals to meet their needs.

The embodiments described herein provide technologies and techniques for evaluating vast amounts and types of data to generate models related to professionals in specific industries. These technologies can extract information from large and varied data sets, transform the data into a consistent format, utilize various training sets and existing models to generate new models related to predicting professional expertise. The embodiments disclosed further include technologies for providing a graphical user interface and search functionality to match specific user needs with appropriate professionals. In some embodiments, the systems and methods described herein further provide technologies for evaluating data related to the needs of a consumer and automatically recommending appropriate professionals.

The embodiments described herein can include system d methods for obtaining data associated with one or more professionals, aggregating a subset of the data, analyzing the data wherein the analysis includes information that is representative of the data, and generating one or more models based on the aggregated data and the analysis, wherein the one or more models provide a mapping of at least one expertise to the one or more professionals. The systems and methods further provide for searching for one or more professionals associated with a specified expertise. Additional embodiments include generating training sets related to the data and updating the models based on the training sets.

The embodiments described herein can apply to many fields. Descriptions and applications related to specific domains do not preclude the application of the described embodiments to other technologies or fields.

Figure 1:
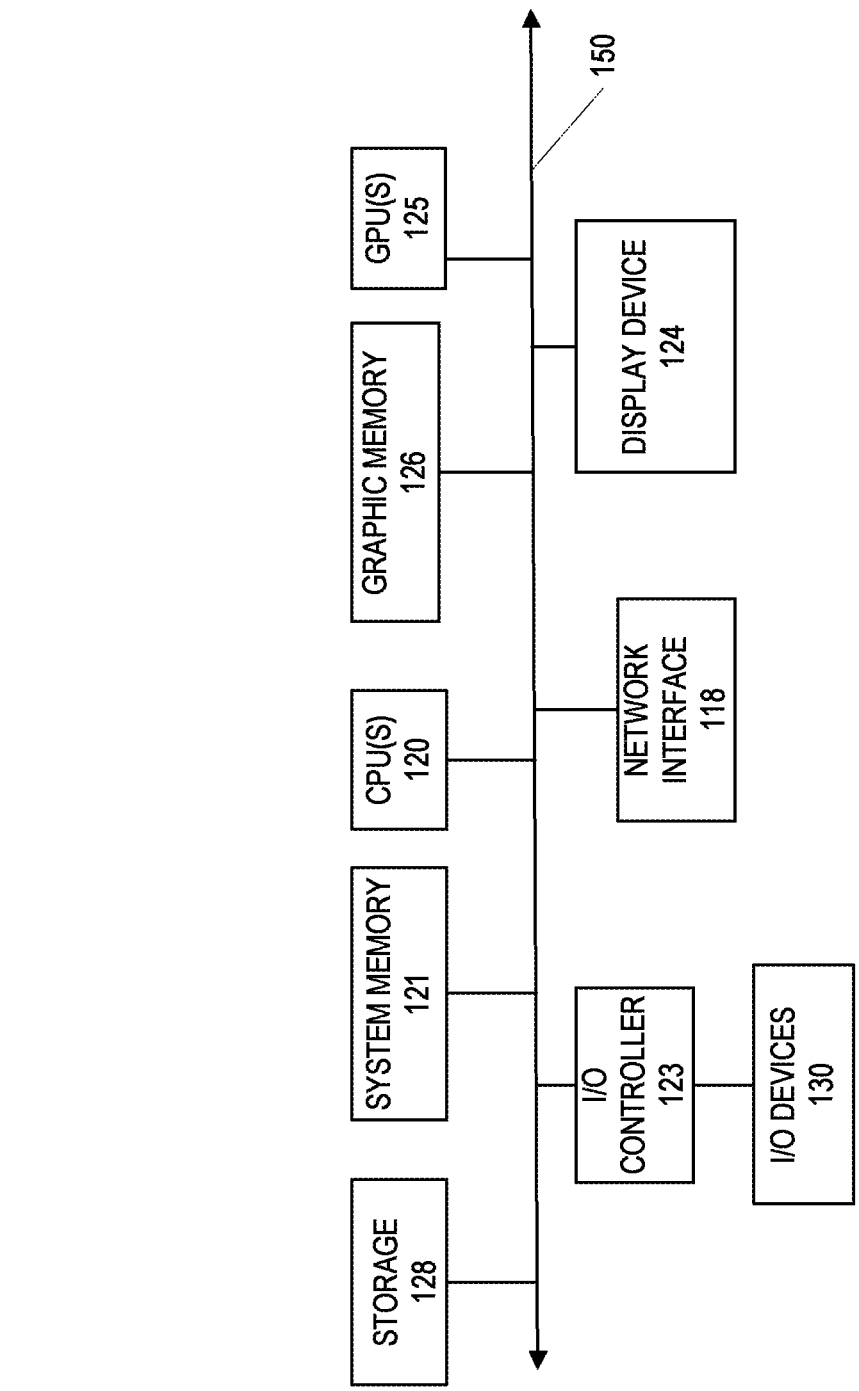
FIG. 1 is a block diagram of an exemplary computing device, consistent with embodiments of the present disclosure.

FIG. 1 is a block diagram of an exemplary computing device 100, consistent with embodiments of the present disclosure. In some embodiments, computing device 100 can be a server providing the functionality described herein. Further, computing device 100 can be a second device providing the functionality described herein or receiving information from a server to provide at least some of that information for display. Moreover, computing device 100 can be an additional device or devices that store and/or provide data consistent with embodiments of the present disclosure.

Computing device 100 can include one or more central processing units (CPUs) 120 and system memory 121. Computing device 100 can also include one or more graphics processing units (GPUs) 125 and graphic memory 126. CPUs 120 can be single or multiple microprocessors, field-programmable gate arrays, or digital signal processors capable of executing sets of instructions stored in a memory (e.g., system memory 121), a cache, or a register. CPUs 120 can contain one or more registers for storing variable types of data including, inter alia, data, instructions, floating point values, conditional values, memory addresses for locations in memory (e.g., system memory 121 or graphic memory 126), pointers and counters. CPU registers can include special purpose registers used to store data associated with executing instructions such as an instruction pointer, instruction counter, and/or memory stack pointer. System memory 121 can include a tangible and/or non-transitory computer-readable medium, such as a flexible disk, a hard disk, a compact disk read-only memory (CD-ROM), magneto-optical (MO) drive, digital versatile disk random-access memory (DVD-RAM), a solid-state disk (SSD), a flash drive and/or flash memory, processor cache, memory register, or a semiconductor memory. System memory 121 can be one or more memory chips capable of storing data and allowing direct access by CPUs 120. System memory 121 can be any type of random access memory (RAM), or other available memory chip capable of operating as described herein.

CPUs 120 can communicate with system memory 121 via a system interface 150, sometimes referred to as a bus. GPUs 125 can be any type of specialized circuitry that can manipulate and alter memory (e.g., graphic memory 126) to provide and/or accelerate the creation of images. GPUs 125 can store images in a frame buffer for output to a display device such as display device 124. GPUs 125 can have a highly parallel structure optimized for processing large, parallel blocks of graphical data more efficiently than general purpose CPUs 120. Furthermore, the functionality of GPUs 125 can be included in a chipset of a special purpose processing unit or a co-processor.

CPUs 120 can execute programming instructions stored in system memory 121 or other memory, operate on data stored in memory (e.g., system memory 121) and communicate with GPUs 125 through the system interface 150, which bridges communication between the various components of computing device 100. In some embodiments, CPUs 120, GPUs 125, system interface 150, or any combination thereof, are integrated into a single chipset or processing unit. GPUs 125 can execute sets of instructions stored in memory (e.g., system memory 121), to manipulate graphical data stored in system memory 121 or graphic memory 126. For example, CPUs 120 can provide instructions to CPUs 125, and GPUs 125 can process the instructions to render graphics data stored in the graphic memory 126. Graphic memory 126 can be any memory space accessible by GPUs 125, including local memory, system memory, on-chip memories, and hard disk. GPUs 125 can enable displaying of graphical data stored in graphic memory 126 on display device 124.

Computing device 100 can include display device 124 and input/output (I/O) devices 130 (e.g., a keyboard, a mouse, or a pointing device) connected to I/O controller 123. I/O controller 123 can communicate with the other components of computing device 100 via system interface 150. It is appreciated that CPUs 120 can also communicate with system memory 121 and other devices in manners other than through system interface 150, such as through serial communication or direct point-to-point communication. Similarly, GPUs 125 can communicate with graphic memory 126 and other devices in ways other than system interface 150. In addition to receiving input, CPUs 120 can provide output via I/O devices 130 (e.g., through a printer, speakers, or other output devices).

Furthermore, computing device 100 can include a network interface 118 to interface to a LAN, WAN, MAN, or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. Network interface 118 can comprise a built-in network adapter, network interface card, PCMCIA network card, card bus network adapter, wireless network adapter, USB network adapter, modem or any other device suitable for interfacing computing device 100 to any type of network capable of communication and performing the operations described herein.

Figure 2:
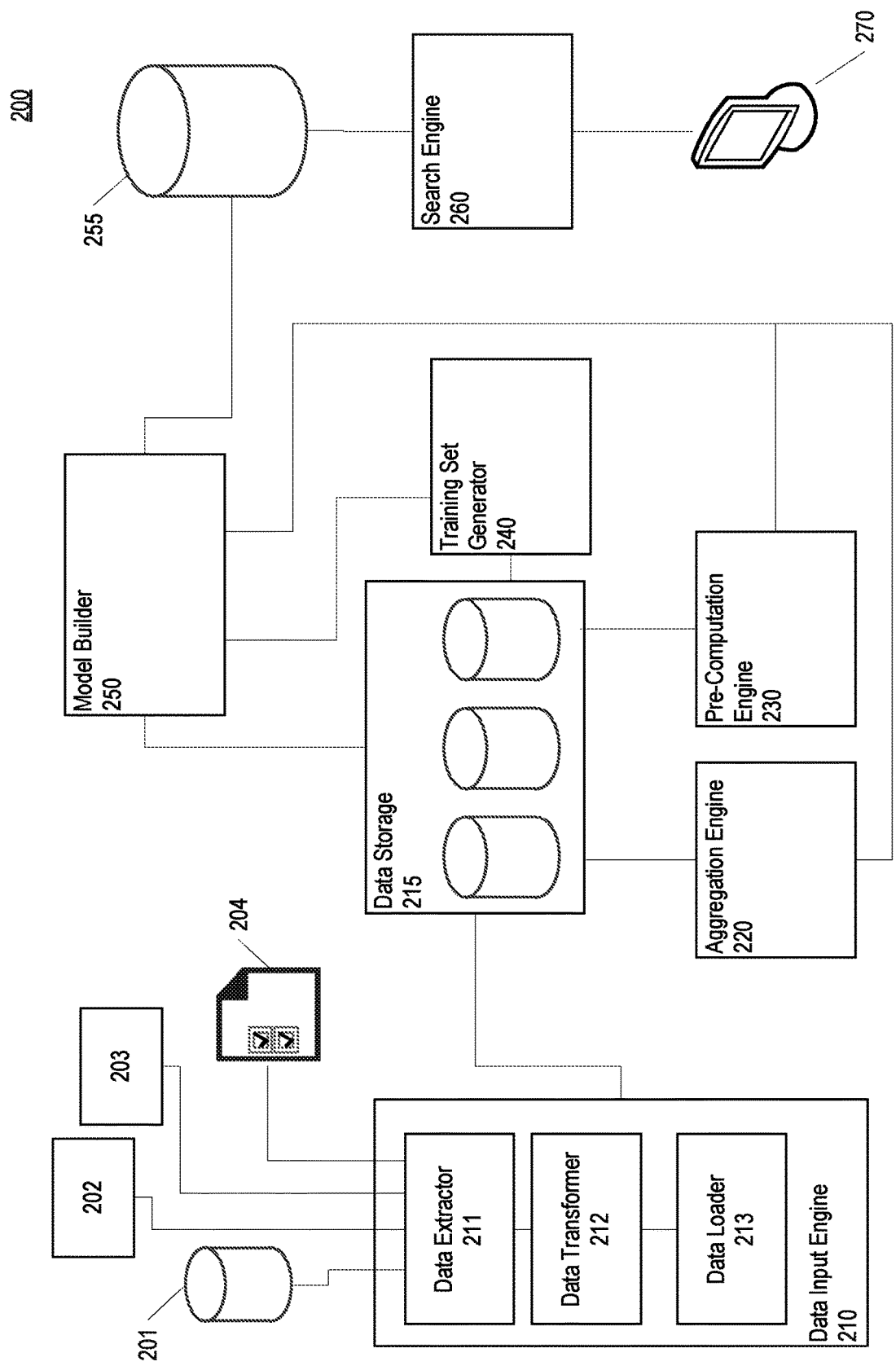
FIG. 2 is a block diagram of an exemplary system for data driven expertise mapping, consistent with embodiments of the present disclosure.

FIG. 2 is a block diagram representing exemplary system 200 for data driven expertise mapping consistent with embodiments of the present disclosure. System 200 can include data input engine 210 that can further include data extractor 211, data transformer 212, and data loader 213. Data input engine 210 can process data from data sources 201-204. Data input engine 210 can be implemented using computing device 100 from FIG. 1. For example, data from data sources 201-204 can be obtained through I/O devices 130 and/or network interface 118. Further, the data can be stored during processing in a suitable storage such as storage 128 and/or system memory 121.

Data input engine 210 can also interact with data storage 215. Data storage 215 can further be implemented on a computing device such as computing device 100 that stores data in storage 128 and/or system memory 121 as shown in FIG. 1.

System 200 can include aggregation engine 220, pre-computation engine 230, training set generator 240, and model builder 250. Similarly to data input engine 210, aggregation engine 220, pre-computation engine 230, training set generator 240, and model builder 250 can be implemented on a computing device such as computing device 100 from FIG. 1, can utilize storage 128 and/or system memory 121 for storing data, can utilize 110 device 130 or network interface 118 for transmitting and/or receiving data.

System 200 can further include storage 255, search engine 260, and user interface 270, which can all also be implemented on a computing device such as computing device 100 described in FIG. 1. Each of data input engine 210, data extractor 211, data transformer 212, data loader 213, aggregation engine 220, pre-computation engine 230, training set generator 240, model builder 250, search engine 260, and user interface 270 can be a module, which is a packaged functional hardware unit designed for use with other components or a part of a program that performs a particular function of related functions. Each of these modules can be implemented using computing device 100 of FIG. 1. Each of these components is described in more detail below.

In some embodiments, the functionality of system 200 can be split across multiple computing devices (e.g., multiple devices similar to computing device 100) to allow for distributed processing of the data. In these embodiments the different components can communicate over I/O device 130 or network interface 118.

System 200 can be related to many different domains or fields of use. Descriptions of embodiments related to specific domains, such as healthcare, is not intended to limit the disclosed embodiments to a those specific domains, and embodiments consistent with the present disclosure can apply to any domain that utilizes predictive modeling based on available data.

Data input engine 210 is a module that can retrieve data from a variety of data sources (e.g., data source 201, 202, 203, and 204) and process the data so that it can be used with the remainder of system 200. Data input engine 210 can further include data extractor 211, data transformer 212, and data loader 213.

Data extractor 211 acquires and/or retrieves data from data sources 201, 202, 203, and 204. Each of these data sources can represent a different type of data source. For example, data source 201 can be a database. Data source 202 can represent structured data. Data sources 203 and 204 can be flat files. Further, data sources 201-204 can contain overlapping or completely disparate data sets. As an example, data source 201 can contain physician demographic information while data sources 202, 203, and 204 contain various insurance claim, drug claim, and medical treatment data. This data can represent services related data. In a healthcare context, services related data can include, among other things, information about services offered or performed by a physician. For example, data source 201 can contain data structure 300 of FIG. 3, data source 202 can contain data structure 400 of FIG. 4, and data source 203 can contain data structure 500 of FIG. 5. Data extractor 211 can interact with the various data sources, retrieve the relevant data, and provide that data to data transformer 212.

Data transformer 212 can receive data from data extractor 211 and process the data into standard formats. In some embodiments, data transformer can normalize data such as dates. For example, data source 201 can store dates in day-month-year format while data source 202 can store dates in year-month-day format. In this example, data transformer 212 can modify the data provided through data extractor 211 into a consistent date format. Accordingly, data transformer 212 can effectively clean the data provided through data extractor 211 so that all of the data, although originating from a variety of sources, has a consistent format. Datatransformer 212 can provide the normalized data to data loader 213.

Data loader 213 can receive the normalized data from data transformer 212. Data loader 213 can merge the data into varying formats depending on the specific requirements of system 200 and store the data in an appropriate storage mechanism such as data storage 215. In some embodiments, data storage 215 can be data storage for a distributed data processing system (e.g., Hadoop Distributed File System, Google File System, ClusterFS, and/or OneFS). In some embodiments, data storage 215 can be a relational database (described in more detail below). Depending on the specific embodiment, data loader 213 can optimize the data for storing and processing in data storage 215. In some embodiments, data structures 300, 400, and 500 from FIGS. 3, 4, and 5 (or versions thereof) can be stored by data loader 213 in data storage 215.

Data storage 215 can provide storage and access to data processed by data input engine 210. The data stored in data storage 215 can be provided in a single database or can be distributed over multiple databases that are synchronized or aggregated together to provide a single data store. In some embodiments, data storage 215 is a distributed database management system (DDBMS) (e.g., Apache's Cassandra) that provides multiple databases all containing synchronized data. In this type of system, the components of system 200 can access any of the databases provided as part of data storage 215. Writes and updates to one of the various databases provided by data storage 215 can be synchronized across the databases in the distributed cluster by data storage 215. By distributing the storage across multiple physical database nodes, data storage 215 can provide improved reliability and access to data stored in data storage 215.

Aggregation engine 220, pre-computation engine 230, and model builder 250 can process the data prepared by data input engine 210 and stored in data storage 215. Aggregation engine 220, pre-computation engine 230, and model builder 250, can retrieve data from data storage 215 that has been prepared by data input engine 210. For example, data structures 300, 400, and 500 of FIGS. 3, 4, and 5, each of which are described in more detail before returning to additional description of system 200, can be suitable inputs to aggregation engine 220, pre-computation engine 230, and model builder 250.

As shown in FIG. 3, data structure 300 is an exemplary data structure, consistent with embodiments of the present disclosure. Data structure 300 can store data records associated with professionals. While data structure 300 is shown to store information related to physicians, it is appreciated that it can store information related to any profession. Data structure 300 can, for example, be a database, a flat file, data stored in memory (e.g., system memory 121), and/or data stored in any other suitable storage mechanism (e.g., storage 128).

In some embodiments, data structure 300 can be a Relational Database Management System (RDBMS) (e.g., Oracle Database, Microsoft SQL Server, MySQL, PostgreSQL, and/or IBM DB2). An RDBMS can be designed to efficiently return data for an entire row, or record, in as few operations as possible. An RDBMS can store data by serializing each row of data of data structure 300. For example, in an RDBMS, data associated with record 301 of FIG. 3 can be stored serially such that data associated with all categories of record 301 can be accessed in one operation. Moreover, an RDBMS can efficiently allow access of related records stored in disparate tables. For example, in an RDBMS, data structure 300 of FIG. 3 and data structure 400 (described in more detail below) of FIG. 4 can be linked by a referential column. In this example, professional ID 480 of data structure 400 can directly relate to professional ID 310 of data structure 300. An RDBMS can allow for the efficient retrieval of all records in data structure 400 associated with a record of data structure 300 based on a common value for the respective professional ID fields (e.g., professional ID 480 of data structure 400 and professional ID 310 of data structure 300).

In some embodiments, data structure 300 of FIG. 3 can be a non-relational database system (NRDBMS) (e.g., XML, Cassandra, CouchDB, MongoDB, Oracle NoSQL Database, FoundationDB, and/or Redis). A non-relational database system can store data using a variety of data structures such as, among others, a key-value store, a document store, a graph, and a tuple store. For example, a non-relational database using a document store could combine all of the data associated with a particular professional ID (e.g, professional ID 310 of data structure 300 and professional ID 480 of data structure 400 in FIG. 4) into a single document encoded using XML. In this example, the XML document would include the information stored in record 302 of data structure 300 and record 405 of data structure 400 based on these records sharing the same professional ID value.

Data structure 300 of FIG. 3 can include data records 301-305 representing physicians in addition to countless additional records up to record 399. Data structure 300 can contain many thousands or millions of records of data and is limited only by the physical constraints of the system upon which the data structure exists.

Data structure 300 can include categories of data representing a physician. For example data structure 300 can include categories professional ID 310, gender 320, age 330, location 340, specialty 350, and affiliations 360. Data associated with data records 301-305 can be stored under each of these categories. For example, a physician represented by data record 301 has a person ID of "1," is male as represented by an "M" under gender 320, is 54 as listed under age 330, works in zip code "94403" as represented under location 340, specializes in cardiology as represented under specialty 350, and is affiliated with the Palo Alto Medical Foundation (PAMF) as represented by affiliations 360.

In some embodiments, data structure 300 can contain more or fewer categories for each data record. For example, data structure 300 can include additional categories of data such as certifications, education, publications, or any other category of data associated with an professional. Moreover, depending on the circumstances, data structure 300 can contain domain specific data. For example, in a healthcare context, in addition to healthcare specific specialty 350 and affiliations 360 data, data structure 300 can include insurance coverage information, practice or group name, teaching positions, or other information related to a physician. Accordingly data structure 300 is not limited to only those categories shown in FIG. 3.

In some embodiments, data structure 300 contains categories that store similar data. For example, data structure 300 can include location 340 that represents a home address zip code, while an additional "location" category (not shown) can be used to store a business zip code.

Additionally, data structure 300 can include combination categories. For example, instead of only using location 340 to represent location information, data structure 300, in some embodiments, includes categories for, among others, street address, state, city, and/or country. This data can be stored under one category or separate categories that, together, represent a location.

Moreover, location 340 can store different types of data. In some embodiments, location 340 is a zip code. In other embodiments, location 340 is a combination category as previously described. Location 340 can further include, geospatial coordinates, map coordinates, or any other data type that indicates location.

Similarly to location 340, other categories, such as age 330, specialty 350, and affiliations 360, can include data in a variety of formats. For example, age 330 can be represented in years, in years and months, in days, or by a date of birth.

In some embodiments, data stored under a category can be a reference into another data set or data structure as is common in relational data sets. For example, specialty 350 and affiliations 360 can contain an identifier that references a description stored in a separate data set or lookup table instead of containing text or another data type.

Additionally, as shown in FIG. 4, data structure 400 is an exemplary data structure, consistent with embodiments of the present disclosure. Data structure 400 can store data records associated with events that are further associated with specific individuals. Similarly to data structure 300 described in FIG. 3, data structure 400 can, for example, be a database, a flat file, data stored in memory (e.g., system memory 121 of computing device 100 from FIG. 1), an RDBMS, an NRDBMS, and/or data stored in any other suitable storage mechanism (e.g., storage 128 of computing device 100 from FIG. 1). Moreover, data structure 400 can be implemented or stored computing device similar to computing device 100 described in FIG. 1.

Data structure 400 can store information related to events. Data structure 400 can include data records 401-406 representing data associated with specific events in addition to countless additional records up to record 499. Data structure 400 can contain millions or billions of records of data and is limited only by the physical constraints of the system upon which the data structure exists.

Data structure 400 can include categories of data. For example, data structure 400 can include the categories event ID 410, person ID 420, cost 430, code 1 440, code 2 450, code 3 460, date 470, and professional ID 480. Data associated with data records 401-406 can be stored in each respective row of data structure 400 within one of these categories. For example, an event represented by data record 401 is associated with a person ID 420 of "1," has a cost 430 of "$8000," has values of "409," "10021," and "R0076," for code 1 440, code 2 450, and code 3 460, respectively, a date 470 of "Jan. 1, 3010," and a professional ID 480 of "3."

Moreover, data structure 400 can include multiple data records associated with the same individual or professional. For example, data records 401-403 all have a value of 1 for person ID 420. Moreover, data records 401-404 all have a value of 3 for professional ID 480. These values can refer to a person ID number or professional ID number stored in a separate data set. For example, professional ID 480 can refer to professional ID 310 of data structure 300 described in FIG. 3. In this example, data records 401-404 of data structure 400 can be associated with data record 303 of data structure 300. Moreover, data record 405 of data structure 400 can be associated with data record 302 of data structure 300 and data record 406 of data structure 400 can be associated with data record 305 of data structure 300 based on the values in professional ID 480 and professional ID 310 of data structure 300 in FIG. 3.

In some embodiments, the data records in data structure 400 are all related to the same type of event or a specific domain. For example, data structure 400 can contain data records related to medical insurance claims. In these embodiments, data structure 400 includes additional categories that are specific to these types of events or domains, such as categories for deductibles. Moreover, in these embodiments, existing categories may contain information related to the domain of the data. For example, in embodiments where data structure 400 includes health insurance claim data, code 1 440, code 2 450, and code 3 460 can represent International Statistical Classification of Diseases and Related Health Problems (ICD) codes, Current Procedural Terminology (CPT) codes, and Healthcare Common Procedure Coding System (HCPCS) codes respectively. Additionally, these types of codes can represent hierarchical data. Accordingly, a specific code in one of code 1 440, code 2 450, or code 3, 460 may imply additional codes or procedures based on the specific classification system in use. In a different domain, code 1 440, code 2 450, and code 3

460 can represent different identifying information for the events represented in data structure 400.

Similarly to data structure 300, data structure 400 can include more or fewer categories for each data record depending on the domain and the source of the data record. Additionally, as described in relation to data structure 300, some categories of data structure 400 can store data in different formats that represent the same concept, such as a date or cost. For example, date 470 can contain only a month and year, or can contain month, day, and year. In a similar example, cost can contain values in terms of United. States Dollars or in terms of other currencies.

Additionally, as shown in FIG. 5, data structure 500 is an exemplary data structure, consistent with embodiments of the present disclosure. Data structure 500 can store data records associated with events that are further associated with specific individuals. Similarly to data structure 300 and data structure 400 described in FIGS. 3 and 4, data structure 500 can, for example, be a database, a flat file, data stored in memory (e.g., system memory 121 of computing device 100 from FIG. 1), an RDBMS, an NRDBMS, and/or data stored in any other suitable storage mechanism (e.g., storage 128 of computing device 100 from FIG. 1). Moreover, data structure 500 can be implemented or stored computing device similar to computing device 100 described in FIG. 1.

Data structure 500 can store information related to events associated with a product. For example, event could be the purchase of a product, or in the domain of healthcare, prescription information related to a drug. Data structure 500 can include data records 501-506 representing data associated with a specific event in addition to countless additional records up to record 599. Data structure 500 can contain millions or billions of records of data and is limited only by the physical constraints of the system upon which the data structure exists.

Data structure 500 can include categories of data. For example, data structure 500 can include the categories event ID 510, product ID 520, person ID 530, cost 540, date 550, and professional ID 560. Data associated with data records 501-506 can be stored in each respective row of data structure 500 within one of these categories. For example, an event represented by data record 501 is associated with a product ID 520 of "0573-0133," person ID 530 of "1," has a cost 540 of "$4,500," a date 550 of "Jan. 1, 3010," and a professional ID 580 of "5." In this example, product ID 520 can be a reference to the ID for a drug listing in the National Drug Code (NDC) database, and data record 501 can represent a prescription for a medication, such as Advil®. Moreover, data structure 500 can include multiple data records associated with the same individual or professional. For example, data records 501-503 all have a value of "1" for person ID 530. Moreover, data records 501-504 all have a value of 3 for professional ID 580. These values can refer to a person ID number or professional ID number stored in a separate data set. For example, professional ID 580 can refer to professional ID 310 of data structure 300 described in FIG. 3. In this example, data records 501-504 of data structure 500 can be associated with data record 303 of data structure 300. Moreover, data record 505 of data structure 500 can be associated with data record 302 of data structure 300 based on the values in professional ID 580 and professional ID 310 of data structure 300 in FIG. 3.

In some embodiments, the data records in data structure 500 are all related to the same type of event or a specific domain. For example, data structure 500 can contain data records related to drug prescription claims. In these embodiments, data structure 500 includes additional categories that are specific to these types of events or domains, such as categories for deductibles. Moreover, in these embodiments, existing categories may contain information related to the domain of the data. For example, in embodiments where data structure 500 includes drug prescription claim data, product ID 520 can represent National Drug Codes (NDC) that are part of the National Drug Code Directory.

Similarly to data structure 300 and data structure 400, data structure 500 can include more or fewer categories for each data record depending on the domain and the source of the data record. Additionally, as described in relation to data structure 300 and 400, some categories of data structure 500 can store data in different formats that represent the same concept, such as a date or cost. For example, date 550 can contain only a month and year, or can contain month, day, and year. In a similar example, cost can contain values in terms of United States Dollars or in terms of other currencies.

Referring back to FIG. 2, aggregation engine 220 can retrieve the data stored in data storage 215 (e.g., data structures 300, 400, and 500 from FIGS. 3, 4, and 5), and further aggregate the data into information usable for building models. Aggregation engine 220 can combine data from various tables into a more usable form as well as combining information stored in the same tables that may be indicative of similar events. Additionally aggregation engine 220 can aggregate only a subset of the available data or data sets depending on the circumstances. In a healthcare context, for example, aggregation engine 220 can combine medical claim data stored in data structure 400 of FIG. 4 with prescription drug data stored in data structure 500 of FIG. 5. For example, by using professional ID 480 and professional ID 560 of data structures 400 and 500, respectively, aggregation engine 220 can combine data records 401-404 of data structure 400 and records 501-504 into one data set that is representative of the general behavior of the physician represented by professional ID "3."

Additionally, aggregation engine 220 can consider many additional data sets processed by data input engine 210 and stored in data storage 215 beyond those data sets shown in FIGS. 4 and 5. For example, additional data sets may contain drug prescription data but relying on a different coding system than the coding system corresponding to product ID 520 of data structure 500. In this example, aggregation engine 220 can analyze both sets of data and produce a unified data set that includes information from the different forms of data in a standard data set that both fully represents the drug prescription data associated with a practitioner and is also in a format usable by other components of system 200.

Aggregation engine 220 can aggregate data stored within the same data set. For example, the NDC numbers used to represent medications can include many product IDs or codes for essentially the same drug. For example, different codes can be used for name brand drugs Advil, Motrin, and the generic drug Ibuprofen even though all of these drugs use the same formula and are used to treat similar conditions or symptoms. Moreover each of the different dosage possibilities for a drug (e.g., Advil) can be represented by different NDC numbers. Aggregation engine 220 can combine data that includes all of these different variations into a generalized format to represent drug prescriptions associated with a doctor for a pain reliever that uses the formula for ibuprofen. This format can be more useful for analyzing the types of conditions a doctor treats or the types of procedure a physician performs than data divided by specific dosage and name brand. In some embodiments, aggregation engine 220 can rely on information external to the data sets obtained using data input engine 210. These data sets can be stored in data storage 215 and can include, for example, the previously described NDC data.

In some embodiments, aggregation engine 220 can aggregate claims and prescription data based on the associated physician. Aggregation engine 220 can combine all data for a particular physician or create multiple aggregated data sets based on grouping according to specific categories. For example, aggregation engine 220 can aggregate claims data for a particular physician into multiple groups of data based on procedure names, diagnosis-codes, and/or date ranges. Data records 401, 402, 403, and 404 of FIG. 4 can all be associated with the same physician (e.g., a physician having a professional id of 3). If data records 402, 403, and 404 are all associated with the same procedure, aggregation engine 220 can create a grouping that contains only data records 402, 403, and 404 based on their related physician and procedure data. In another example, aggregation engine 220 can create a grouping of data records 401, 402, and 403 based on a date range that includes any claims after 2010. Aggregation engine can combine the available date in multiple ways creating multiple aggregations or groupings from the same set of data.

Referring back to FIG. 2, pre-computation engine 230 can retrieve and process data stored in data storage 215 (e.g., data structures 300, 400, and 500 from FIGS. 3, 4, and 5). In addition to processing the data provided by data input engine 210, pre-computation engine 230 can process data output from aggregation engine 220 and stored in data storage 215. Moreover, pre-computation engine 230 can utilize data external to the data obtained using data input engine 210. This external data can be stored in data storage 215. Pre-computation engine 230 can analyze the various data sets and produce additional analytics and details regarding the data sets. This analysis can be in the form of statistics related to the data sets or in the form of data that represents additional determinations that can be drawn from the data. The analysis can contain any additional information that is representative of the analyzed data. Pre-computation engine 230 can process extremely large sets of data in an efficient manner in order to provide optimized data sets for model builder 250.

In a healthcare context, pre-computation engine 230 can analyze all of the claims data and provide count information based on the number of claims that are available. Each count can correspond to a specific ICD, CPT, HCPCS, and/or NDC code and represent the number of times a physician has used a specific code or prescribed a specific drug.

Pre-computation engine 230 can also analyze groupings within the various data sets to make additional determinations. For example, pre-computation engine 230 can recognize, using known data stored in, for example, data storage 215 or based on other data sources, that a certain combination of drugs are used to treat a specific disease or are used for a specific procedure. For example, a specific grouping of drugs is used to treat multiple-sclerosis (MS). Pre-computation engine 230 can analyze a data set and, if pre-computation engine determines that multiple records of claims and/or drug prescriptions show treatments using or prescriptions for the grouping of drugs associated with MS, pre-computation engine 230 can indicate that the physician associated with the records likely treats MS.

Pre-computation engine 230 can also use combined code information to make determinations regarding treatment patterns of physicians. Often times, a single ICD code can indicate a broad range of conditions or treatments or can be tangentially related to other conditions. For example, physicians that treat obesity and physicians that treat conditions related to insulin production can both use ICD codes for diabetes even though the specific conditions treated are different and the treatments utilized could benefit completely different types of patients. Pre-computation engine 230 examines additional claims for a patient associated with a physician as well as alternate coding systems to determine the specific condition treated by comparing the grouping of claims and codes against known data sets. Accordingly even though, both physicians use the code associated with diabetes, pre-computation engine 230 can use the additional claims and code data to determine a distinction between the specific conditions treated by each physician.

Moreover, pre-computation engine 230 can produce intermediate models for use by model builder 250. For example, large sets of patient claim data can be analyzed by pre-computation engine 230 to determine common attributes or characteristics that are consistent with specific patient conditions. For example, all of the available patient and claims data can be analyzed to generate intermediate models that predict, based on the claims data and possibly other data sources, patients that suffer from diabetes. This intermediate model can be provided to model builder 250, which can then use the pre-computed or pre-analyzed model to determine which physicians treat those identified patients and diabetes in general. In some embodiments, pre-computation engine 230 identifies treatments associated with patients where procedure codes did not previously provide sufficient specificity.

Pre-computation engine 230 can utilize any available type of data or dataset and is not limited to claims data. For example, pre-computation engine 230 can combine prescription drug claims data, patient history or demographic data, patient survey information, or any other type of data to generate or improve intermediate models or data. Pre-computation engine 230 can also use these additional datasets independently to produce intermediate models. Pre-computation engine 230 can produce many intermediate models, data sets, or analysis for use by model builder 250 depending on the available data, the specific domain, or the settings for the particular system.

Model builder 250 can utilize the data stored in data storage 215 to generate models that associate professionals with the specific services they provide. The data stored in data storage 215 can include both the original data provided by data input engine 210 as well as additional data created or compiled by aggregation engine 220 and/or pre-computation engine 230. The data used can be domain specific to the industry being considered and can further include data external to the data obtained using data input engine 210. This external data can be stored in data storage 215. The following described embodiments that discuss model generation in relation to healthcare is not meant to limit the applications of the disclosed embodiments to that particular industry. The use of healthcare is an exemplary example of the techniques used to generate models for professional expertise mapping.

In embodiments related to healthcare, model builder 250 can process the available data to produce models that associate physicians with the specific conditions they treat or the specific procedures, treatments, and/or expertise they offer. The models can result in better patient care by allowing patients to find physicians that treat their specific conditions. For example, a patient that requires a stent can utilize the models generated by model builder 250 to find cardiologists, radiologists, interventional radiologists, or other specialist who specifically place stents while avoiding members of those same specialties who possess little or no expertise in placing stents.

Model builder 250 can utilize a number of techniques to build models. Model builder 250 can use data created by aggregation engine 220 to inform the model. For example, as previously described, aggregation engine 220 can combine related drug information into a combined set of the types of drugs prescribed by a particular physician. Additionally, pre-computation engine 230 can associate certain groupings of drugs with a particular treatment or condition. For example, aggregation engine 220 can combine information related to the various dosages and names for different drugs that are used to treat MS. This aggregation can combine both generic and name brand drugs into a unified set. Accordingly, where the data may have initially appeared to indicate that the physician was prescribing unrelated drugs, the data provided to model builder 250 by aggregation engine 220 can better indicate that even though the names, dosages, or NDC numbers for the various drugs are different, they can map to a smaller set of related or similar drugs.

For example, drug prescription data can indicate that a patient received Betaseron® in various dosages over a period of time and then received Extavia® in various dosages for an additional period of time. In some embodiments, aggregation engine 220 can further delineate the information based on specific date ranges or time intervals. Although, the differences in brand name and dosages, in this example, could result in multiple different drug records each having different NDC numbers, aggregation engine 220 can provide model builder 250 with a unified data set that demonstrates that each of these records indicates that the condition was treated with Interferon beta 1b, the generic formulation for Betaseron® and Extavia®. Accordingly, model builder 250 can receive information that a condition was treated with Interferon beta 1b, even though that information is based on multiple data records that initially appeared unrelated. Moreover, as previously discussed, pre-computation engine 230 can provide information that drugs, such as Interferon beta 1b, are known to be used to treat a specific condition, such as MS. Model builder 250 can utilize the two types of information provided by aggregation engine 220 and pre-computation engine 230 to determine that the physicians aggregated drug data corresponds to the computed set of drugs that are used to treat MS and to determine that the physician treats MS.

In another example, model builder 250 can use physician demographic information to determine treatment of certain conditions. For example, model builder 250 can identify a physician who treats a particular condition or set of conditions. Model builder 250 can further analyze additional demographic information (e.g., physician demographic information stored in data structure 300 of FIG. 3) and identify physicians who had similar education, fellowships, publications, affiliations, and/or certifications. Additional demographic factors can also be used. In this way, model builder 250 can use demographic information associated with a physician known to treat certain specific conditions, and determine that a physician, for which there is little claim data, also treats similar conditions based on demographic information.

Model builder 250 can use existing base models as initial inputs. For example, model builder 250 can utilize basic claim counting. In this example, model builder can determine that a physician performs knee replacements if a physician is associated with a large number of claims associated with knee replacements or a large number of claims associated with knee replacements relative to other physicians with similar practices. Alone, this type of data can lead to both false positives and false negatives. For example, simply counting claims can provide no context about whether or not the count is significant enough to consider the physician to have expertise in knee replacements potentially resulting in identifying physicians who are not actually experts. Moreover, there may be many physicians who perform knee replacement but because the claim data can be incomplete, they can be identified as not performing knee replacements. Although this type of data alone has drawbacks, when combined with other data sources, such as, among others, insurance guides, self-reported specialties, physician demographic information, publications, and/or prescription drug records, it can further inform the model generation.

Another example of a basic model used by model builder 250 is specific claim information. For example, although coding systems may include generic codes, some coding systems also contain very specific codes that are associated with a very specific condition. For these types of conditions, physicians using those specific codes can be determined to treat those specific conditions. Codes that provide the necessary level of specificity can vary based on the domain and can be determined empirically. Model builder 250 can be provided with information relating to which codes provide the necessary level of specificity and which codes do not. This information can be stored in, for example, data storage 215. As an example, in a healthcare domain, ICD 9 codes using the abbreviations for Not Elsewhere Classified (NEC) or Not Otherwise Specified (NOS) can be considered too generic to provide a specific condition. Additionally, codes such as E66.9 for "Obesity, unspecified" or S09.02 for "Unspecified injury of the nose" can be determined to be too general to identify a specific condition. But, as an example, ICD 9 codes 201.58 for "Hodgkin's disease, nodular sclerosis, lymph nodes of multiple sites" and 249.7 for "Secondary diabetes mellitus with peripheral circulatory disorders" can be specific enough to identify physicians who treat those specific conditions.

Additionally, model builder 250 can rely on known information regarding common claims. For example, if the vast majority of the time, physicians justify treatments for acid reflux using a specific code from one of the various coding systems, claim data utilizing that specific code can indicate that the associated physicians treat acid reflux.

In addition to the data sources already discussed, included data represented by data structures 300 of FIG. 3, 400 of FIG. 4, and 500 of FIG. 5, additional types of data can be used by model builder 250. For example, in a healthcare context, in addition to the medical and pharmacy claims discussed, model builder 250 can rely on data that includes behavioral health claims, academic publications, physician specialties, physician referral patterns, physician board certifications and licenses, physician residency information, and/or physician fellowship training. Moreover, in addition to the methods already discussed above, model builder 250 can utilize various algorithms for generating the models that include probabilistic graphical modeling (e.g., bayesian networks, association rules (e.g. Apriori, FP-Growth, and/or Eclat), supervised and semi-supervised learning, and/or dimensionality reduction.

In addition to the data sets stored in data storage 215 and the initial base models, which can also be stored in data storage 215, model builder 250 can use training sets provided by training set generator 240 during model creation.

Training set generator 240 can use a variety of mechanisms for developing training sets to test a model. In some embodiments related to healthcare, training set generator can use known data about physicians or claims associated with specific treatments or procedures as training data. Training set generator 240 can select a subset of this known information and provide it to model builder 250 to test and refine the generated models.

Training set generator 240 can use additional sources of information to create both positive and negative training sets. In the context of healthcare, medical publications include Medical Subject Headings (MeSH terms) standardized by the National Institute of Health that can categorize publications as relating to particular treatments or conditions. Training set generator can identify a condition commonly treated by physicians in a certain specialty. For example, training set generator 240 can gather specific terms related to different conditions classified under diabetes. For a given MeSH term, training set generator 240 can then examine physician data to determine which of those physicians publish on diabetes but do not publish on the specific MeSH term associated with the conditions being targeted. Training set generator 240 can use this as a negative training set to compare to the generated model of physicians who treat the conditions associated with the selected MeSH term. Similarly training set generator 240 can use similar logic to identify physicians who do publish on that specific MeSH term as a positive training set for comparing to the generated models.

Training sets can additionally be created based on other types of data and methods. Claims data can be used to create training sets. By using a specific collection of procedures or diagnosis codes that correspond to a specific condition, training set generator 240 can select those physicians associated with a large number of those types of claims as a positive training set. Additionally, information about conditions that physicians treat can be retrieved from the physician's staff or office or crowd-sourced information about treatments a physician has provided. Training set generator 240 can use this information to create additional positive training sets. Moreover, training set generator 240 can analyze information such as board certifications and/or membership within certain societies that have been empirically determined to indicate the treatment of certain conditions to generate additional positive training sets.

As shown, a variety of data sets, (e.g. base models based on the number of claims and/or prescriptions, the specificity of coding systems, and commonly used claim data, unaltered data stored in data storage 215, data generated by aggregation engine 220, data generated by pre-computation engine 230, training sets created by training set generator 240, and previous models produced by model builder 250) can be used by model builder 250 to create models. Each data sets can be used alone or in combination with any of the other data sets. The specific domain and purpose of the model can determine which data sets are used. For example, a model used to determine physicians who treat MS can, as previously shown, rely on a combination of known treatment patterns stored in data storage 215 or provided by training set generator 240, claims data stored in data storage 215, aggregated data from aggregation engine 220, and computed analytics from pre-computation engine 230, to determine that physicians using codes related to MS and prescribing groups of drugs commonly used to treat MS likely treat MS. Alternatively, when conditions are represented by very specific codes, looking at only claim data can be sufficient to determine physicians who treat that condition. As shown above, claims that include ICD 9 code 201.58 for "Hodgkin's disease, nodular sclerosis, lymph nodes of multiple sites" can provide enough specificity to determine that a physician treats the coded condition.

The basis for which data sources are used by model builder 250 can be based on user configuration, past model generation, or statistical analysis of generated models. Techniques such as Structure Learning or other probabilistic graphical models can be used to select sources. Also, the type of condition being modeled can determine which data sources can be the most useful. This determination can be made based on empirical information, the structure of the model being produced, statistical analysis, or specified by the user of system 200.

Model builder 250 can continue to utilize additional training sets and other data as it is made available to continually refine the generated models. Model builder 250 can store generated models in data storage 255. Data storage 255 can, for example, be a database, a flat file, data stored in memory (e.g., system memory 121 of computing device 100 from FIG. 1), an RDBMS, an NRDBMS, and/or data stored in any other suitable storage mechanism (e.g., storage 128 of computing device 100 from FIG. 1). In some embodiments, data storage 255 can be part of data storage 215.

Search engine 260 can provide access to the information stored in data storage 255. In particular, search engine 260 can provide access to the models created by model builder 250. In embodiments related to a healthcare context, search engine 260 can receive user input (i.e., through user interface 270, described in more detail below) identifying a condition, and search the available models for physicians that treat that specific condition. By using the models generated by model builder 250, the resulting list of physicians can include physicians classified under many different traditional specialties who all treat the specific condition and their corresponding contact information. By providing access to models created by model builder 250, search engine 260 can provide results tailored to the patient's specific needs as opposed to simply providing physicians who are associated with general specialties and who do not actually treat the specified condition.

Search engine 260 can utilize additional filters and processing in order to provide more relevant results. For example, search engine 260 can utilize a natural language processor translate commonly used phrases or wording into medical terms that would be used by model builder 250. This allows a user of search engine 260 to input a common phrase but receive accurate results based on the underlying medical terms used.

Search engine 260 can utilize geographic filtering to provide results related to a user's specific location. This can be useful in domains, such as healthcare, where a patient can only travel a certain distance to see a physician. Results for physicians outside of range (predetermined or indicated by the user) can be irrelevant.

Additionally, search engine 260 can consider user preferences. In embodiments related to healthcare, some patients can have gender or language preferences for physicians that treat them. Search engine 260 can account for these preferences when providing the results. In another example, past history may indicate that a patient requires physicians identified as having certain styles of bedside manner. This type of data can be included in the models generated by model builder 250 and can be used by search engine 260 to provide more relevant results.

Additionally, in some embodiments, search engine 260 can provide results without specific user input. For example, past medical history or past interactions with a system can indicate that an individual needs a physician that treats a specific condition. A system utilizing search engine 260 can proactively generate search results based on the generated models and provide those results in the form of recommendations to the patient without the patient needing to search for a specific condition.

System 200 can further include user interface 270. User interface 270 can be a graphical user interface displayed on a computing device such as computing device 100 of FIG. 1 (e.g., using display device 124). In some embodiments, user interface 270 accepts user input and provides that input to search engine 260. Moreover, user interface 270 can provide the output of search engine 260 on a graphical user interface and allow the user to interact with the results. In some embodiments, the results from search engine 260 can be incorporated into a separate application displayed on user interface 270 that incorporates the data provided by search engine 260.

FIG. 6 is a flowchart of an exemplary method 600 for data driven expertise mapping. It will be readily appreciated that the illustrated procedure can be altered to delete steps or further include additional steps. After initial step 601, the system (e.g., system 200 from FIG. 2) can obtain (step 610) data associated with at least one event (e.g., data stored in data structures 300, 400, and 500 of FIGS. 3, 4 and 5). Obtaining the data can include, as described in relation to FIG. 2, extracting (e.g., using data extractor 211) the data from multiple data sources (e.g., data sources 201-204), transforming the data (e.g., using data transformer 212), and loading the data (e.g., using data loader 213) into a storage location (e.g., data storage 215) for additional analysis. Through this process, the system can prepare data from a variety of sources into a normalized and consistent representation ready for further processing.

The system can further aggregate (step 620) the data (e.g., using aggregation engine 220). As previously shown, the system can identify different data sets that contain similar or related types of information and aggregate that data into common data sets. Moreover, the system can combine related data within the same data into a unified data set. The system can further generate aggregate information related to the data combined in the data sets. This information can include the number of certain codes referenced by certain professionals or, in a healthcare context, the number of prescriptions for a certain drug or grouping of drugs written by a physician. The system can aggregate all data or only a subset of the available data.

The system can also determine analytics (step 630) or other statistics related to the data (e.g., using pre-computation engine 230). These statistics can be based both on the cleaned data (e.g., data stored in data storage 215) or aggregated data (e.g., data provided by aggregation engine 220). The system can analyze the data sets to generate some initial statistics or analysis based on the various types of data. The analysis generated by the system can include information that is representative of the data analyzed. As previously shown, the system can identify sets of codes or other identifiers that commonly refer to the same expertise. In some embodiments related to healthcare, the system can identify groupings of drugs or treatments that are indicative of a specific treatment or conditions. This analysis is exemplary, and the system can perform additional analytics to generate statistics or other determinations based on the provided data. The system can store the results of the analysis for later use (e.g., in data storage 215).

The system can generate (step 640) one or more models (e.g., using model builder 250) based on the obtained data (e.g., data stored in data storage 215), aggregated data (e.g., data stored in data storage 215 and generated by aggregation engine 220), statistical or analytical data (e.g., data stored in data storage 215 and generated by pre-computation engine 230), as well as predetermined base models or other data. Using these various data sets, the system can create one or models adapted to analyze data associated with professionals and determine the professionals' specific expertise. In a healthcare context, the system can identify physicians who treat a specific condition. In some embodiments, these models can identify physicians across specialties who, nevertheless, can treat the same conditions.

In some embodiments, the system updates (step 650) the one or more mod using training set data (e.g., training sets provided by training set generator 240). The system can use various methods to create training sets that can be used to inform the model creation. For example, training sets can be generated, as previously described, based on cross-referencing physician treatment codes with MeSH terms associated with physician publications to determine characteristics and behavioral patterns of physicians known to publish on and treat certain specific conditions. Additionally, the system can use a similar analysis to build negative training sets containing physicians who use certain diagnosis codes but do not publish or treat certain conditions that can be associated with those diagnosis codes. By creating training sets, the system can create models that better identify specific expertise for professionals.

After generating models and/or updating models based on training sets, the system can provide (step 660) the one or models for searching (e.g., by storing the models in data storage 255, which can be accessible to and used by search engine 260). The system can utilize the generated models to search for specific expertise or needs. In a healthcare context, the system can search the models to identify physicians who treat a specific condition or who perform a specific procedure.

The system can provide (step 670) a user interface (e.g., using user interface 270) that displays the results of the search (e.g., results output by search engine 260). The system can also accept user input to direct the search. The system can provide the results in response to direct input from a user or can provide results pre-emptively based on data known about the user. For example, the system can provide recommendations for treating physicians based on information associated with a patient who has previously provided claim or medical history.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. Moreover, it is intended that descriptions and examples related to specific domains are not limiting and that the disclosed embodiments can be applied to a variety of different domains. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. An electronic device comprising:
a first data storage configured to store a plurality of data sets based on multiple data sources, wherein the plurality of data sets include services related data;
an aggregation engine configured to combine data from the plurality of data sets into one or more aggregated data sets wherein the combination is based on categories associated with the one or more data sets;
a pre-computation engine configured to analyze the plurality of data sets;
a training set generator configured to provide one or more training sets related to the plurality of data sets;
a model builder configured to:
determine, using a combination of at least two of the services related data, the analysis of the plurality of data sets, the aggregated data sets, and the one or more training sets, one or more services provided by one or more service providers;
responsive to the determination, generate one or more models, wherein the one or more models provide a mapping of at least one service to one or more service providers;
evaluate the one or more models based on known values; and
store, in a second data storage device, an expertise indication based on the one or more models.

2. The electronic device of claim 1, wherein the analysis of the pre-computation engine further generates analytics or intermediate models based on the one or more data sets.

3. The electronic device of claim 2, wherein the model builder configured to determine one or more service providers is further configured to use the analytics or intermediate models.

4. The electronic device of claim 1, further comprising:
a search engine configured to search for at least one service providers that is associated with a specified service, wherein the search engine uses the one or more models.

5. The electronic device of claim 1, further comprising:
a graphical user interface configured to display the indication based on the one or more models.

6. The electronic device of claim 1, wherein the model builder updates the one or more models based a comparison with existing models.

7. A method performed by one or more processors and comprising:
obtaining a plurality of data sets from one or more data sources, wherein the plurality of data sets include services related data;
aggregating data from the plurality of data sets into one or more aggregated data sets wherein the combination is based on categories associated with the one or more data sets;
analyzing the plurality of data sets;
generating one or more training sets related to the plurality of data sets;
generating one or more models, wherein:
the one or more models are based on determining one or more services provided by one or more service providers using a combination of at least two of the services related data, the analysis of the plurality of data sets, the aggregated data sets, and the one or more training sets; and
the one or more models provide a mapping of at least one service to one or more service providers;
evaluating the one or more models based on known values; and
storing an expertise indication based on the one or more models.

8. The method of claim 7, wherein the analysis of the plurality of data sets further comprises generating analytics or intermediate models based on the one or more data sets.

9. The method of claim 8, wherein determining one or more services provided by one or more service providers further uses the analytics or intermediate models.

10. The method of claim 7, further comprising searching for at least one service providers that is associated with the specified service, using the one or more models.

11. The method of claim 7, further comprising displaying, on a graphical user interface, the indication based on the one or more models.

12. The method of claim 7, further comprising updating the one or more models based on comparing the one or more models with existing models.

13. A non-transitory computer readable storage medium storing instructions that are executable by a first computing device that includes one or more processors to cause the first computing device to perform a method for data driven expertise mapping, the method comprising:
obtaining a plurality of data sets from one or more data sources, wherein the plurality of data sets include services related data;
aggregating data from the plurality of data sets into one or more aggregated data sets wherein the combination is based on categories associated with the one or more data sets;
analyzing the plurality of data sets;
generating one or more training sets related to the plurality of data sets;
generating one or more models, wherein:
the one or more models are based on determining one or more services provided by one or more service providers using a combination of at least two of the services related data, the analysis of the plurality of data sets, the aggregated data sets, and the one or more training sets; and
the one or more models provide a mapping of at least one service to one or more service providers;
evaluating the one or more models based on known values; and
storing an expertise indication based on the one or more models.

14. The non-transitory computer readable medium of claim 13, wherein the analysis of the plurality of data sets further comprises generating analytics or intermediate models based on the one or more data sets.

15. The non-transitory computer readable medium of claim 14, wherein determining one or more services provided by one or more service providers further uses the analytics or intermediate models.

16. The non-transitory computer readable medium of claim 13, further comprising searching for at least one service provider that is associated with the specified service, using the one or more models.

17. The non-transitory computer readable medium of claim 13, wherein the set of instructions that are executable by the at least one processor of the first computing device to cause the first computing device to further perform:
displaying, on a graphical user interface, the indication based on the one or more models.

18. The non-transitory computer readable medium of claim 13, wherein the set of instructions that are executable by the at least one processor of the first computing device to cause the first computing device to further perform:
   updating the one or more models based on comparing the one or more models with existing models.

* * * * *